United States Patent

[11] 3,625,872

| [72] | Inventor | Kaneyoshi Ashida<br>Tokyo, Japan |
|---|---|---|
| [21] | Appl. No. | 736,571 |
| [22] | Filed | June 13, 1968 |
| [45] | Patented | Dec. 7, 1971 |
| [73] | Assignee | Nisshin Boseki Kabushiki Kaisha<br>Tokyo, Japan |
| [32] | Priority | June 15, 1967 |
| [33] | | Japan |
| [31] | | 42/37878 |

[54] FLAME-RESISTIVE POLYURETHANE FOAM COMPOSITION
8 Claims, No Drawings

[52] U.S. Cl. .................................................. 260/2.5 AK,
260/2.5 AJ, 260/2.5 AW, 260/2.5 AC,
260/2.5 AT, 260/77.5 NC, 260/77.5 AT
[51] Int. Cl. ............................................... C08g 22/06,
C08g 22/46, C08g 51/10
[50] Field of Search ........................................ 260/2.5 AJ,
2.5 AK, 2.5 AW

[56] References Cited
UNITED STATES PATENTS

| 3,256,218 | 6/1966 | Knox .......................... | 260/2.5 |
| 3,396,126 | 8/1968 | Gurley et al. ............. | 260/2.5 |

FOREIGN PATENTS

| 908,337 | 10/1962 | Great Britain ............... | 260/2.5 AW X |
| 1,478,759 | 4/1967 | France .......................... | 260/2.5 |
| 1,511,865 | 12/1967 | France .......................... | 260/2.5 |

OTHER REFERENCES

Condensed Chemical Dictionary, 5th Ed. Reinhold, (N.Y.), 1956, pages 286, 537, 728, and 1150–1151. Call No. QD5C5

Dutch Patent Specification Publication No. 6705694 (1967), 15 pages.

Bulletin No. HR–26 of E. I. du Pont de Nemours & Co., Inc., Published Apr. 1958, pp. 11–12.

Saunders et al., Polyurethanes, Part II, pp. 220–225 (1964).

*Primary Examiner*—Donald E. Czaja
*Assistant Examiner*—H. S. Cockeram
*Attorneys*—Robert E. Burns and Emmanuel J. Lobato

ABSTRACT: This invention relates to flame-resistive, nonflammable foam compositions comprising a flame-resistive organic foam material and an inorganic filler. The flame-resistive organic foam material is produced by using an aromatic polyisocyanate having no ortho substituent, an active hydrogen-containing compound, a foaming agent and a catalyst and the inorganic filler is graphite, talc, or inorganic fiber or the like. The flame-resistive foam compositions are used as insulators for walls, chemical plants and tanks for storing a liquefied natural gas and other apparatus.

FLAME-RESISTIVE POLYURETHANE FOAM COMPOSITION

This invention relates to a foam composition having outstanding flame resistivity, nonflammability and high thermal-insulating properties.

The first object of the present invention is to provide a foam having highly flame-resistive and nonflammable foamed material. The second object of the present invention is to provide a foam which generates less smoke in a flame. The third object of the present invention is to offer a foam having low thermal conductivity. Further objects of the present invention will be apparent in the following description.

Many lightweight materials or foamed materials consisting of inorganic powder and plastics are well known. For example, it is well known that inorganic porous powder, e.g., perlite, is bonded with polyurethane resin, phenolic resin and the like to make a lightweight and heat-resistive insulant. However, these insulants still have poor heat resistivity and high thermal conductivity. Highly flame-resistive, and lower thermally conductive foams have not yet been found.

In recent years, the demand of an insulator having the above-mentioned properties have been increasing, because curtain wall core materials for high building, insulants for chemical plant, insulants for tanks for storing a liquefied natural gas, etc., require highly flame-resistive foams having lower thermal conductivity.

The foamed materials obtained by the present invention can satisfy the requirements mentioned above.

The main point of the present invention resides in the combination of highly flame-resistive organic foam material and inorganic filler. Precisely speaking, the present invention is explained as follows:

A flame-resistive foam composition is provided consisting of 5 to 200 parts by weight of inorganic filler and 100 parts by weight of flame-resistive organic foam material, in which the inorganic filler is unoxidizable and nonhygroscopic, and is selected from the group consisting of powder, granule and fiber, the flame-resistive organic foam material being composed of (a) an aromatic polyisocyanate having no ortho substituent, (b) an active hydrogen-containing compound having a molecular weight of more than 300 and a functionality of at least two, (c) a foaming agent for the preparation of polyurethane foams, and (d) a catalyst selected from the conventional catalysts for trimerization of said isocyanate group, the proportions of said components being such as to satisfy the relationship $$Ae/(Be+Ce+De) > 2 \text{ and } 0.4 > Bw/Aw > 0$$

wherein the suffix "$e$" represents the number of chemical equivalent of each of the components, suffix "$w$" represents the weight of each of the components, and said components Ce and De are eliminated from the above equation when components C and/or D are not reacted with the component A.

An inorganic filler to be used in the present invention is unoxidizable and nonhygroscopic, and is selected from the group consisting of powder, granule, and fiber. If an inorganic filler which is oxidizable is used, the foam becomes flammable. If an inorganic filler which is hygroscopic is used, the foam absorbs moisture and the thermal conductivity of the foam is increased. The state of the inorganic filler should be selected from the group consisting of powder, granule, and fiber. The preferable filler is powder or fiber and granular inorganic filler may be used.

Some examples of inorganic filler having a fire-extinguishing property are calcium carbonate, ammonium hydrogen phosphate, potassium iodide, potassium chloride, ammonium sulfate, barium sulfate, calcium sulfate.

Some examples of inorganic filler having no fire-extinguishing property but having the effect of reducing smoke density and increasing heat resistivity are graphite, kaolin, mica, talc, alumina, aluminum powder, asbestos powder, inorganic fibers such as glass fiber, rock wool and carbon fiber, powders or granules of porous inorganic materials such as perlite, chips of foamed glass and pumice stone.

The amount of the inorganic filler is varied depending on the state, apparent density, particle size, etc. For example, the amount of inorganic fiber to be mixed with liquid foaming ingredients by ordinary means is 10 to 15 percent, and in the case of spraying of both the fiber and the liquid foaming ingredients at the same time, the percentage may be increased to more than 100 but less than 200 percent. In the case of powder, the percentage may increased up to 40 to 50 percent, and if the foaming rate is slower, the percentage may be increased.

The method of mixing the inorganic filler and foaming ingredients is optional. In a mixing method, the filler is added in one or more ingredients before foaming. In most cases, it is convenient that the filler be added to the isocyanate component which is the largest part of the ingredients.

Another mixing method involves spraying of inorganic filler and foaming ingredients at the same time. For this purpose, for example, a Peterson spraying machine for use in spraying of fiber-reinforced polyester, made by Peterson Products Co., Ltd., may be used.

Preferable inorganic filler to be used in the present invention is one having a low specific gravity and lubricating property. The most preferable one is graphite powder, which produces a stable dispersion and does not produce sediment readily because of its low specific gravity. Talc powder is a preferable inorganic filler, which has a lubricating property, and also gives higher flame resistivity to the foam than that of graphite, but its dispersion is more unstable than graphite.

The highly flame-resistive organic foam material can be made by the use of the following raw materials and specific reaction condition, which are described in detail in copending U.S. Pat. application Ser. No. 615,395.

Therefore, the patent is referred to herein as follows:

The polyisocyanates to be used in the present invention are aromatic polyisocyanates having no ortho substituent. Some examples of aromatic polyisocyanates are 4,4'diphenylm ethane diisocyanate, triphenylmethane triisocyanate, biphenyl diisocyanate, m-phenylene diisocyanate, p-phenylene diisocyanate, 1,5-naphthylene diisocyanate and polymethylene polyphenyl isocyanate or their mixtures.

A polyisocyanate having an orthosubstituent such as 2,4- and 2,6-tolylene diisocyanate (isomer ratio 80/20), so called TDI, is not used in the present invention.

The reason why the above-mentioned isocyanate is not preferable is that the orthosubstituent hinders the trimerization of isocyanate groups. For example, even if the aforementioned three elements are used in the preparation of TDI based foam, the flame resistivity of the foam obtained is extremely poor.

The polyfunctional, active hydrogen-containing compounds to be used in the present invention are polyhydroxyl and/or polycarboxyl compounds having a molecular weight of more than 300 and a functionality of at least two.

The molecular weight of the active hydrogen compounds is more than 300. If the molecular weight is less than 300, the foam becomes more friable. For example, when glycerol or trimethylol propane-based foam is prepared by using the aforementioned combination of the three elements, the foam obtained is too friable for actual use.

The polyfunctional, active hydrogen compounds may be liquid or solid. The liquid state is preferable, but when it is solid, it may be liquefied by the addition of a solvent which is inert to an isocyanate group. The active hydrogen-containing compound may be reacted with polyisocyanate to form the liquid prepolymer. Nevertheless, if the solid does not dissolve in any inert solvent or does not form the liquid prepolymer, it cannot be used.

Some examples of the polyfunctional, active hydrogen compounds include polyesters having polyhydroxyl and/or polycarboxyl groups, polyether polyols, polymerized fatty acids or so called dimer acids, hydroxyl-terminated polymers of copolymers of vinyl or diene compounds.

The polyfunctional, active hydrogen-containing compound can be used alone or in combination.

Some examples of the preparation of the polyether polyol and polyester are described in the book "Polyurethanes, Chemistry and Technology" by J. H. Saunders and K. C. Frisch, Part 1, pgs. 30–47, pgs. 349–351, and Part 2, pgs. 857–865. Another example of a polyether polyol is described in Japanese Pat. No. 300,617, and vinyl copolymer is hydroxyl-terminated copolymer of butadiene and acrylonitrile. An example of hydroxyl-terminated copolymer available in the market is Poly BD Resin (Registered trade name, Sinclair Co. Ltd.).

Polymerized fatty acid is also known as a raw material for the preparation of polyurethane foams.

A preferable polyfunctional, active hydrogen compound is a polyether polyol having a molecular weight of more than 300 and a functionality of at least two and more preferably the polyether polyol is a triol or tetrol having a molecular weight of more than 300 and less than 1,500.

Foaming agents which are used for the preparation of conventional polyurethane foams may be used in the present invention. The foaming agents are nonreactive volatile organic solvents, compounds generating a gas on heating and reactive foaming agents or their mixtures, as described in the Saunders' book, Part 1. Some examples of the nonreactive organic solvents are chlorofluoroalkanes, such as dichlorodifluoromethane, monofluorotrichloromethane, trichlorotrifluoroethane, n-pentane, n-hexane, 1,2-dichloroethane and tetrachloromethane. Examples of gas-generating compounds are diazominobenzene, azodiisobutyronitrile and asohexahydrobenzonitrile.

Some examples of the reactive foaming agents include water, nitroalkanes, aldoximes, nitroureas, acid amides, boric acid, and acetyl acetone.

Catalysts which are conventional for the trimerization of isocyanate groups may be used in the present invention. Some examples are described in the literature, such as Saunders, J. R. and Frisch, K. C. "Polyurethanes, Chemistry and Technology," Part 1, pgs. 94–97, and 212, Beitchmann, B. D. Rubber Age, Feb. 1966, Beitchmann, B. D. I&EC Product Research and Development, Vol. 5, No. 1, pgs. 35–41, Mar. 1966, and Micolas, L. and Gmitter, G. T., J. Cellular Plastics, Vol. 1, No. 1, pgs. 85–95 (1965).

Examples of catalysts are (a) organic strong bases or salts thereof, (b) tertiary amine cocatalyst combinations, (c) Friedal Crafts Catalysts, (d) basic salts or organic weak acids, (e) alkali metal oxides, alkali metal alcoholates, alkali metal phenolates, alkali metal hydroxides and alkali metal carbonates, (f) onium compounds from nitrogen, phosphorous, arsenic, antimony, sulfur and selenium, (g) epoxides and (h) monosubstituted monocarbamic esters. Preferred catalysts are those which are soluble in other components of the formulation including for example, polyether polyols and fluorocarbons.

Examples of organic strong bases are trialkyl phosphines trialkyl-aminoalkyl phenols and 3-and/or 4-substituted pyridine.

Some examples of the tertiary amine-cocatalyst combinations are triethylene diamine-propylene oxide, triethylene diamine-trioxymethylene, N,N,N,N'-tetramethyl 1,3-butane diamine-propylene oxide, pyridine-propylene oxide, N-methyl morpholine-propylene oxide, triethylene diamine-acetaldehyde, triethylene diamine-alkyleneimine.

Examples of Friedel Crafts catalysts include $AlCl_3$, $FeCl_3$, $BF_3$, and $ZnCl_2$.

Examples of salts of organic weak acids includes (A) alkali metal salts of mono- or dicarboxylic acids of aliphatic, aromatic, alicyclic or aralkyl acids which are described in British Pat. No. 809,809 and also (B) alkali metal salts of organic weak acids excluding carboxylic acids, for example, salts of benzosulfinic acid, nitrophenols, picric acid, phthalimide, and diethyl phosphite.

Preferred salts for use in the present invention are alkali metal salts of $C_6$–$C_{20}$ carboxylic acids, especially potassium salts of such carboxylic acids, such as for example potassium octoate or 2-ethyl hexoate, potassium benzoate and potassium oleate.

Potassium salts are the most effective alkali metal salts. The activity decreases in the order of potassium, sodium and lithium. Rubidium and cesium salts may also be used. Examples of common alkali metal oxides are potassium oxide, sodium oxide and lithium oxide. Examples of alkali alcoholates are sodium methoxide, potassium ethoxide, and potassium alcoholates formed from ethylene glycol or a polyether polyol.

Examples of alkali phenolates are sodium phenolate, sodium 2,4-dinitrophenolate, potassium 2,4,6-trinitrophenolate, sodium 2,4,6-trichlorophenolate and potassium 2,4-dichlorophenolate.

Examples of alkali metal hydroxides and carbonates are hydroxides and carbonates of lithium, sodium, potassium, rubidium, and cesium respectively.

Examples of onium compounds from nitrogen, phosphorous, arsenic, antimony, sulfur, and selenium are described in British Pat. No. 837,120, for example, tetraethyl ammonium hydroxide, benzyltriethylammonium hydroxide, tetraethylphosphonium hydroxide.

Examples of epoxides are described in J. Cellular Plastics, Vol. I, No. 1, pg. 85, 1965.

Examples of monosubstituted monocarbamic ester are described in British Pat. No. 920,080.

The catalysts hereinbefore described are usually used in a state of solution or dispersion. Suitable solvents include water, dimethyl formamide, dimethyl sulfoxide and similar solvents. Polyether polyol or polyester may be also used as a solvent or a dispersion medium in the present invention.

Surfactants which may be used in the present invention are surfactants for the preparation of conventional polyurethane foam. Some examples are a silicon surfactant and a nonionic surfactant. Some examples of the surfactants are described in the Saunders' book mentioned above.

The use of a surfactant is not always necessary in the present invention, and in some cases a foam having good cell structure is obtained without one. It is desirable however in almost all cases where a fine cell structure is required that a surfactant should be used.

Flame retardants which may be used in the present invention are flame retardants for the preparation of conventional polyurethane foams.

Some examples are described in Saunders' book mentioned above, e.g., antimony oxide, halogen-containing phosphates, such as tris-chloroethyl phosphate and tris-dibromopropyl phosphate, and halogen-containing organic compounds, such as perchloropentacyclodecane, tetrachloronaphthalene, and phosphorus-containing polyesters or polyols or halogen-containing polyetherpolyols or polyesters.

The use of a flame retardant is optional in the present invention. However the use of a flame-retardant, especially halogen-containing flame retardant is desirable to give the foam a short time of afterflame.

A highly flame-resistant foam can be obtained by using the specified raw materials described above, and by using the specific conditions hereinafter described.

One of the specified conditions is the ratio between chemical equivalent of reactants that is, the equivalent ratio given by the formula: $Ae/(Be+Ce+De+Ee+Fe)$ must be more than 2.0, where A, B, C, D, E, and F represent polyisocyanate, active hydrogen-containing compound, foaming agent, catalysts, surfactant and flame retardant respectively, and suffix "$e$" represents the number of chemical equivalent of the components. The formula is applied only to the components to be reacted with the isocyanate. When a component inert to the isocyanate is used, the component must be omitted from the calculation of the equivalent ratio from the formula. Some examples of the inert components are flame retardants such as tris-chloroethyl phosphate.

The above-specified condition is a necessary one to give good flame resistivity to the foam by the formation of isocyanurate-rich structure, but the isocyanurate-rich structure alone is not a sufficient condition for obtaining the final product. Another necessary condition to give the foam the flame resistivity is the weight ratio given by the formula: $0.4>Bw/Aw>0$, where Aw and Bw represent the weight of the components A and B respectively in formulation. If this weight ratio is more than 0.4 the flame resistivity of the foam decreases markedly, even if the equivalent ratio is kept within the stated limitation.

These two conditions are essential for the practice of the invention.

The foam composition obtained by the present invention has outstandingly high flame resistivity. An example of comparative data is shown below.

| Foam | Burn through time (Bureau of Mines, R.I. 6366) Min. |
|---|---|
| Nonburning grade urethane foam by ASTM 1692–59T (containing no filler) | 1 |
| ditto (containing 30% of graphite) | 8 |
| ditto (containing 30% of talc) | 15 |
| Foam obtained by this invention (containing 40% of graphite) | 180 |
| ditto (containing 40% of talc) | 220 |

The above-mentioned data shows unexpected flame resistivity of the foam obtained by the present invention. The other unexpected results are no explosive cracking and less shrinkage when the foam obtained by the present invention is exposed to fire. If the inorganic filler is not added in the foaming ingredients, the foam obtained shows remarkable explosive cracking and shrinkage. The foam obtained by the present invention is substantially noncombustible. For example, a flame spread index of the foam by ASTM E-84 is about 10 to 12. These data indicate large potential markets in building industry, chemical plant insulation, aviation industry, mine industry, etc.

Another example to indicate the outstanding flame resistivity of the foam obtained by the present invention is as follows:

The foam was foamed in place in 80 mm. in thickness outside of an iron tube having 200 mm. diameter, 6 mm. thickness, 2,500 mm. length, a sheet of asbestos cloth was wrapped outside of the foamed insulant, a sheet of wire mesh was wrapped around it, and a mortar coating was made over the wire mesh. The insulated tube was kept over a burner having 60 mm. of nozzle which was arranged cylindrically. Propane gas was burned at a rate of 10 cubic meter per hour. The temperature inside of the tube was measured in course of time.

A comparative experiment was made by using two layers of pipe cover of perlite, 50 mm. in thickness.

In the case of perlite insulation, the temperature inside of the tube in the course of experiment was as follows: 130° C. after 10 min., 510° C. after 20 min., 640° C. after 30 min., 670° C. after 35 min.

On the other hand, in the case of a combination of mortar layer and the foam, the temperature elevation was as follows: 60° C. after 1 hour, 310° C. after 10 hours, and the temperature was constant at 310° C. for successive 24 hours.

If the temperature goes up above 700° C., the tensile strength of iron decreases markedly. The above comparative data indicate that the choice of insulant for fire protection is very important in the case of some flameproof insulations, e.g., for the iron frame of skyscrapers, insulation of liquefied gas tanks, because poor insulant provides many possibilities of great accidents. In other words, if poor insulant is used in a skyscraper, the building will collapse by fire when the temperature of iron frame goes up above 700° C. If a liquefied natural gas tank equipped with poor insulant is in a fire, the tank will explode when the temperature of tank goes up above 700° C. In such a case, it is unquestionable, based on the data, that the foam obtained by the present invention is superior than perlite for the purpose hereinbefore described. In addition, the foam obtained by the present invention can make monolithic insulation, which is better than that made by using foam board or any other boards. Furthermore, the speed of processing of pour in place is faster than that of board or pipe cover insulation. Besides, an advantage of the foam obtained by the present invention is that less smoke is generated by the use thereof. Experimental data are shown below.

| Foam | % light absorption | |
|---|---|---|
| | Maximum | Residual |
| A foam obtained by the present invention and containing graphite | 23 | 0 |
| ditto containing talc | 38 | 6 |
| Urethane foam, nonburning grade | 64 | 10 |

The data were obtained by using a method described in NFPA Quarterly Jan. 1964, pp. 276–287.

Conclusively speaking, the foam obtained by the present invention has the following advantages; (a) outstandingly high flame resistivity, (b) very little smoke generation, (c) high thermal insulation, as shown in the following example, (d) noncombustible and (e) low density.

EXAMPLE 1

Sixty-four parts by weight of crude MDI (diphenylmethane diisocyanate, 30.0 to 31.5 percent of NCO, functionality of 2.45) and 30 parts by weight of graphite powder (less than 200 mesh) are mixed to make a dispersion. Another solution is prepared by mixing 12.5 parts of a trimerization catalyst for an isocyanate group, 18.5 parts of sucrose-based polyether polyol having an hydroxyl number of 460, 13.0 parts of flame retardant (trischloroethyl phosphate), 1 part of silicon surfactant L 530 (trade name, Union Carbide Corp.) and 13 parts of trichloromonofluoromethane. The two solutions are mixed together and stirred vigorously to make a foam.

The cure MDI has a chemical equivalent of 135 and the sucrose-based polyether has a chemical equivalent of 122. Thus the equivalent ratio, Ae/Be is $$\frac{64}{135}\bigg/\frac{18.5}{122}=3.14$$

and the weight ratio, Bw/Aw is $18.5/64=0.28$.

As another experiment, 30 parts of talc powder is used instead of graphite in the above formulation. The physical properties of the foams obtained by the two experiments are as follows:

| | 30% graphite | 30% talc |
|---|---|---|
| Density (kg./m.³) | 52.8 | 48.6 |
| Compressive strength, parallel to rise | 1.49 | 1.57 |
| ditto, perpendicular to rise | 0.98 | 1.07 |
| Burn through time, min. | 150 | 180 |
| Water absorption, % | 3.1 | 2.9 |
| Thermal conductivity (Kcal./m./hr.° C.) | 0.021 | 0.0188 |
| Closed cell, % | 93.4 | 91.0 |
| Dimensional stability, 70° C., parallel to rise | 0.2 | 0.2 |
| ditto, perpendicular to rise | −1.3 | −1.2 |
| Dimensional stability, −30° C., parallel to rise | −1.6 | −1.3 |
| ditto, perpendicular to rise | −0.7 | −1.4 |

EXAMPLE 2

Four kinds of foam were prepared according to the same formulation described in example 1, except the variation of the amount of talc. The relation of the content of talc and burn through time was as follows:

| Content of talc (%) | 0 | 10 | 20 | 30 | 40 |

| Burn through time (min.) | 50 | 140 | 150 | 180 | 220 |

EXAMPLE 3

This is an example of foams having markedly small afterflame time. Several kinds of foams were prepared by using the same formulation as in example 1. The amount of inorganic filler was kept at 7 percent. Measurement of afterflame time was as follows:

A hole, 50 mm. in diameter, was made in a sample having a size of 50×100×100 mm. The hole was located over a bunsen burner head at a distance of 35 mm., so that the flame may pass through the hole. The sample was burnt for one minute, and the time which afterflame retains was measured. Consequently, some effective compounds were found as follows:

| inorganic filler | afterflame time (sec.) |
| --- | --- |
| no use | 3 to 5 |
| (NH$_4$)2HPO$_4$ | 0.5 |
| KCl | 1.0 |
| KI | 1.0 |
| BaSO$_4$ | 1.0 |
| (NH$_4$)2SO$_4$ | 1.0 |
| NH$_4$Cl | 1.5 |

Example 4

A foam was prepared according to the same formulation, as set forth in example 1 but using 10 parts by weight of rock wool (10 to 20 mm. in length) instead of graphite powder. Glass fiber was well dispersed in the foam, therefore, explosive cracking or shrinkage in fire were not observed. The use of glass fiber instead of rock wool gave the same results.

What I claim is:

1. A flame-resistant foam composition consisting essentially of 5 to 200 parts by weight of an inorganic filler and 100 parts by weight of a flame-resistant organic foam material, in which the inorganic filler is (i) resistant to oxidation, (ii) nonhygroscopic, and (iii) is selected from a powder, granule, and fiber, and in which the flame-resistant organic foam material is the reaction product of (A) an aromatic polyisocyanate having only hydrogen atoms ortho to any —NCO groups, (B) a polyfunctional active hydrogen-containing compound having a molecular weight greater than 300, (C) a foaming agent, and (D) a catalyst for the trimerization of the —NCO group, said (A), (B), (C), and (D) being present in such amounts so as to satisfy the relationships:

(I)  $Ae/(Be+Ce+De) > 2$, and
(II)  $0.4 > Bw/Aw > 0$ wherein $e$ represents the chemical equivalent of each component, $w$ represents the weight of each component, and $Ce$ is equal to zero when component C does not react with an —NCO group and $De$ is equal to zero when component D does not react with an —NCO group.

2. A foam composition according to claim 1, in which said foam material also includes (E) at least one surfactant, and (F) at least one flame retardant, and in which said (A), (B), (C), (D), (E), and (F) are present in such amount so as to satisfy (I)  $Ae/(Be+Ce+De+Ee+Fe) > 2$ wherein $e$ represents the number of chemical equivalents of each of the components, and $Ce$ is equal to zero when component C does not react with an —NCO group, $De$ is equal to zero when component D does not react with an —NCO group, $Ee$ is equal to zero when component E does not react with an —NCO group, and $Fe$ is equal to zero when component F does not react with an —NCO group.

3. A foam composition according to claim 1 wherein the equivalent ratio represented by relationship (I) is 3 to 10.

4. A foam composition according to claim 1, wherein said inorganic filler is graphite powder.

5. A foam composition according to claim 1, wherein said inorganic filler is talc powder.

6. A foam composition according to claim 1, wherein said inorganic filler is inorganic fiber.

7. A foam composition as defined in claim 1 in which said foam material also includes (F) at least one flame-retardant and in which said (A), (B), (C), (D), and (F) are present in such amount so as to satisfy (I)  $Ae/(Be+Ce+De+Fe) > 2$ wherein $e$ represents the number of chemical equivalents of each of the components and $Ce$ is equal to zero when component C does not react with an —NCO group, $De$ is equal to zero when component D does not react with an —NCO group, and $Fe$ is equal to zero when component F does not react with an —NCO group.

8. A foam composition as defined in claim 1 in which the active hydrogen-containing compound is a sucrose-based polyether polyol.

* * * * *